Sept. 14, 1926.
H. S. FOLKER
MAGNET
Filed July 14. 1922
1,599,516
3 Sheets-Sheet 1
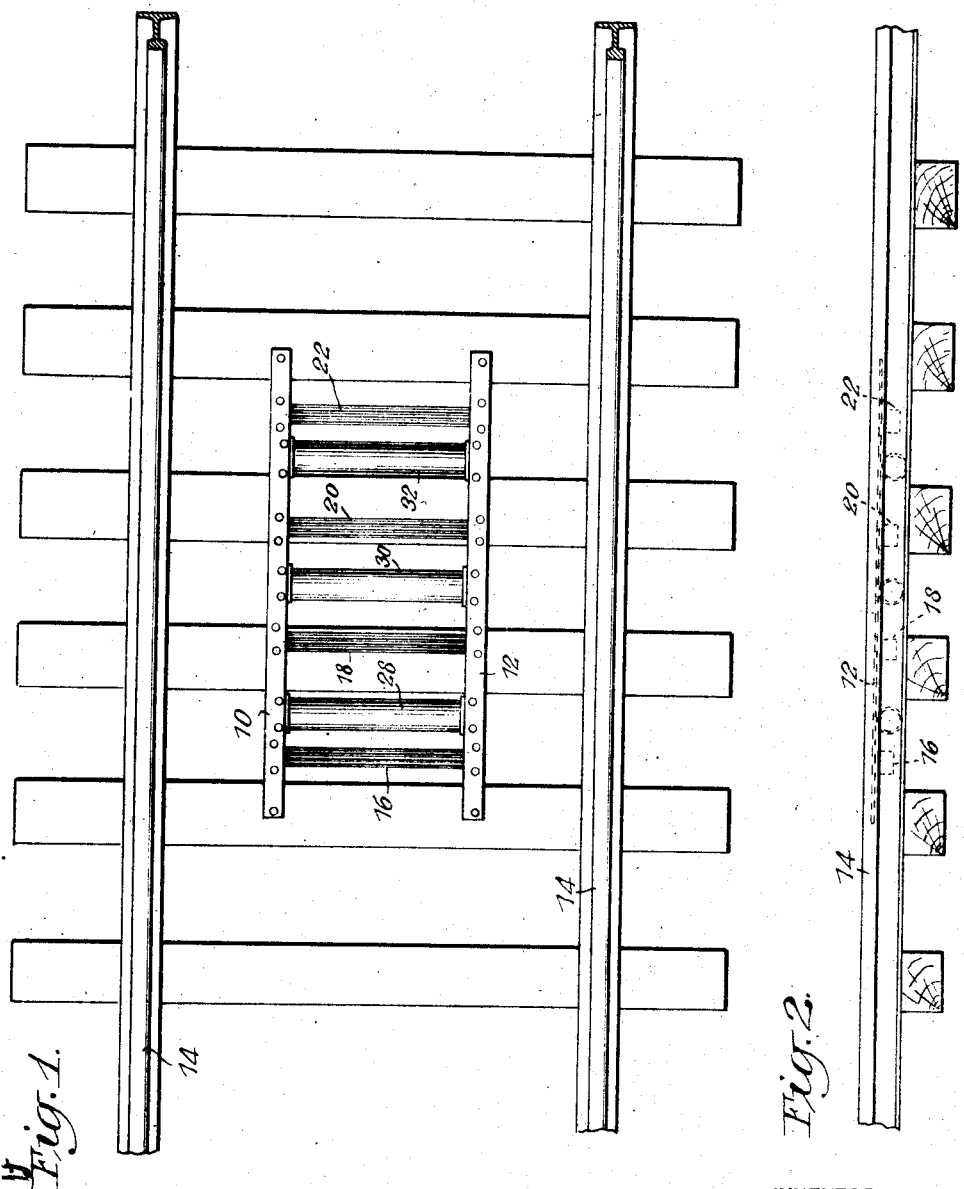

Sept. 14, 1926.

H. S. FOLKER

MAGNET

Filed July 14, 1922

INVENTOR
Howard S. Folker
BY
Cornelius C. Billings
his ATTORNEY

Sept. 14, 1926.
H. S. FOLKER
MAGNET
Filed July 14, 1922
1,599,516
3 Sheets-Sheet 3
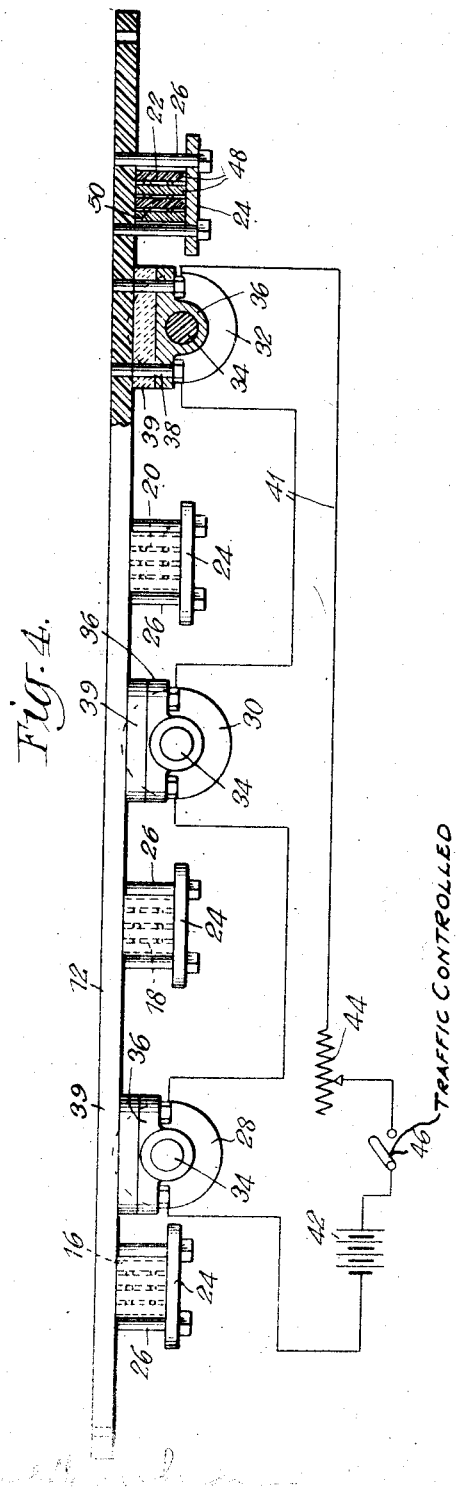
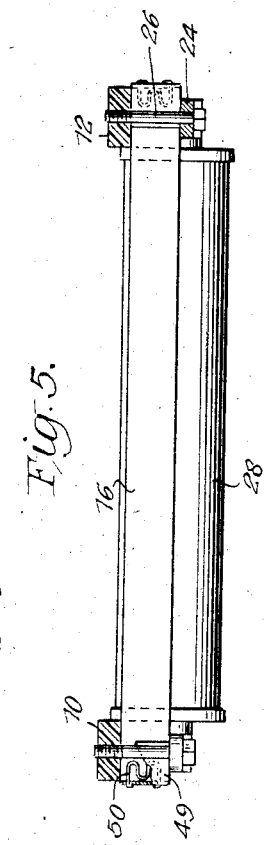

Patented Sept. 14, 1926.

1,599,516

UNITED STATES PATENT OFFICE.

HOWARD S. FOLKER, OF MILL VALLEY, CALIFORNIA, ASSIGNOR TO THE NATIONAL SAFETY APPLIANCE COMPANY, OF SAN FRANCISCO, CALIFORNIA, A CORPORATION OF CALIFORNIA.

MAGNET.

Application filed July 14, 1922. Serial No. 574,920.

This invention relates to magnetic structures, and, more particularly, to an improved track magnet adapted to be positioned between the tracks of a railroad and, through changes in its magnetic field, to control the operation of a brake control mechanism of a passing train.

In devices of this type, the track magnet has heretofore been formed of a permanent magnet and an electromagnet, the polarities of which were opposed to each other, the brake control mechanism being operated by the magnetic influence of the permanent magnet when the electro-magnet was de-energized. Owing to the comparatively short distance or short length of the track over which the magnetic influence or field extended in magnets of this type, and the correspondingly short period of time this magnetic influence was exerted on the brake control apparatus of rapidly moving trains, the operation of the brake control mechanism tended to become uncertain as the speed of the trains increased. This was somewhat augmented by any irregularities in the distribution of the magnetic flux and the tendency of the permanent magnets to become weaker upon standing especially as the permanent magnets were not provided with a closed circuit of iron.

An object of the present invention is to provide a track magnet capable of exerting a uniform magnetic influence upon a moving element responsive to magnetic influences for a sufficient space to control rapidly moving trains.

Another object of the present invention is to provide a permanent magnet having a symmetrical magnetic field of any desired length and a fixed electromagnetic means by which the field of the permanent magnet structure may be modified in intensity as desired without distortion of the symmetrical distribution of the magnetic field.

A further object of the invention is to provide a controlling means for a permanent magnet structure, which, when energized, exerts a strengthening influence upon the magneto-motive force of the magnet members, and which, when not energized, provides a path of relatively low reluctance in the circuit of the magnet members, to assist in preserving the magnetism of the permanent magnets.

A still further object of the invention is to provide a permanent magnet structure which will produce a magnetic field of the desired characteristics, and an electro-magnetic means which will modify such magnetic field with a minimum energy input.

Still further objects of the invention are to provide a simple and rugged construction of the above class having no moving parts, to provide a permanent magnetic circuit substantially closed with iron, but having an external leakage field of any desired extent, and to provide a track magnet for operating train control mechanism upon moving trains, through which a magnetic field uniformly distributed along the axis of the track is provided and an electro-magnetic means associated therewith and capable of being controlled by railway signal systems to neutralize the field of said permanent magnet to prevent the operation of said train control mechanisms.

With these and other objects in view the invention comprises the mechanism described and set forth in the following specification and claims.

The various features of the invention are illustrated in the accompanying drawings, in which, Fig. 1 is a plan view of a track magnet embodying a form of the invention and a section of track showing its position thereon.

Fig. 2 is a view in side elevation of the magnet and portion of track shown in Fig. 1.

Fig. 4 is a side elevation of the track magnet shown in Fig. 3, portions of the apparatus being shown in section, and, Fig. 5 is an end elevation of the track magnet.

Figure 3:
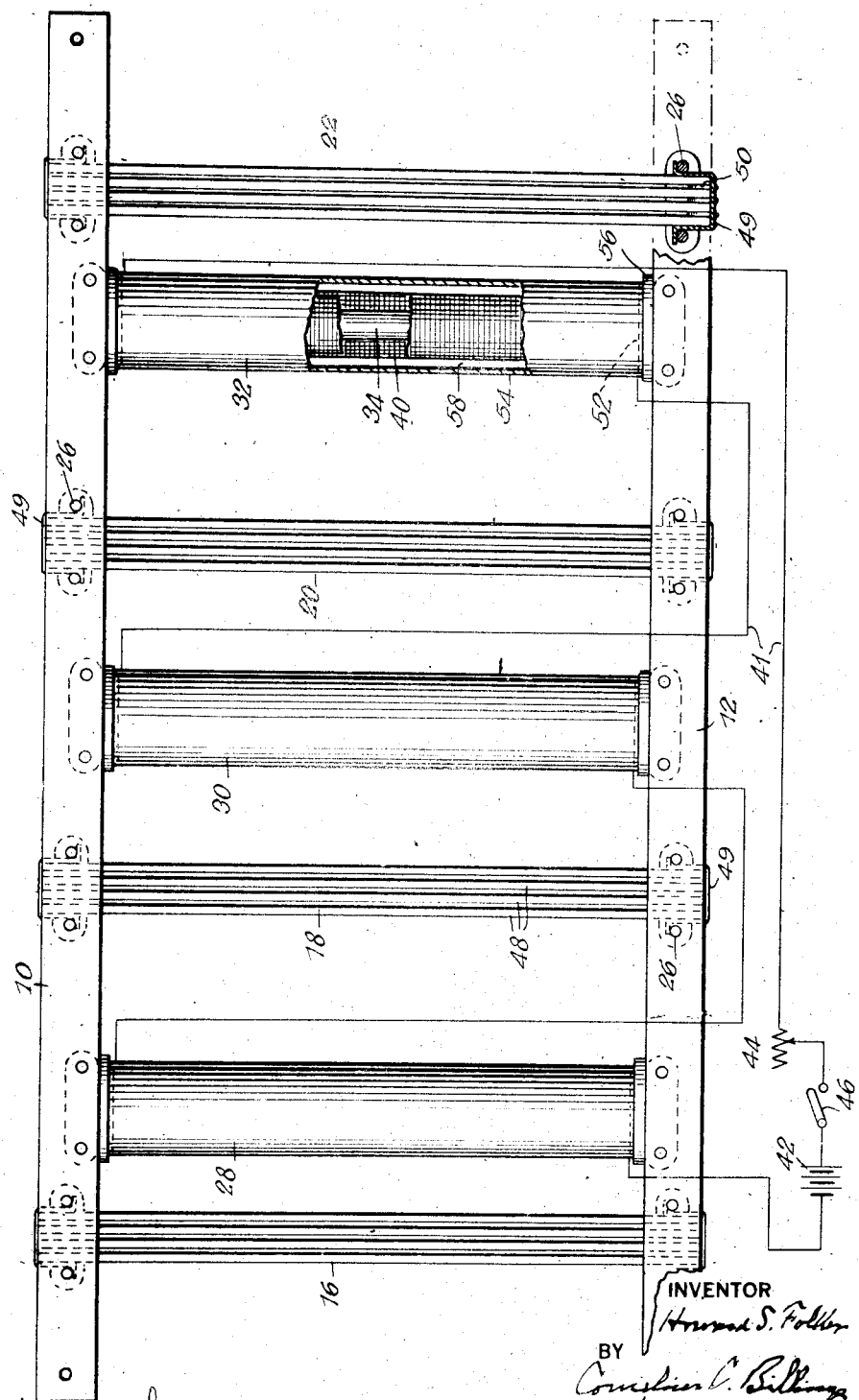
Fig. 3 is a plan view of the track magnet shown in Fig. 1 on a somewhat larger scale, a portion of one electro-magnet being shown in section, and illustrating, diagrammatically, an electric circuit for said electro-magnets.

In the present invention a pair of spaced magnetic equalizing means adapted to lie lengthwise of the tracks is provided, one means of which is arranged to be charged with one polarity and the other with the opposite polarity by permanent magnets in such a manner as to provide a substantially uniform magnetic potential throughout the length of the equalizing means. A number of electro-magnets are so arranged with relation to the magnetic equalizing means, that when energized, they neutralize the magnetic potential of the equalizing means and at all times form with the equalizing means and permanent magnets a substantially closed magnetic circuit of iron. The magnetic equalizing means is preferably formed of a pair of bars of iron or other suitable magnetic material of the desired length, between which are positioned alternately the permanent magnets and the electromagnets, the positive or north poles of all of the permanent magnets and the negative or south poles of the cores of the electromagnets being attached to one of the bars and the opposite poles of the permanent magnets and electro-magnet cores being connected to the other bar.

The electro-magnets are normally not energized. When the electro-magnets are not energized the uniform potential of the equalizer bars produces a uniform field in the atmosphere above the structure. It is this field that is utilized to act upon the control valve upon the moving train to produce a control operation. When it is desired to pass the control valve over the structure without effect upon the control valve, the electro-magnets must be energized to neutralize, or modify, the magnetic potential in the equalizer bars so that the field above the structure resulting from this potential will be zero, or of such slight value as to produce no effect upon the control valve. The cores of the electro-magnets form a part of the magnetic circuit whether or not the electro-magnets are energized.

Referring more particularly to the accompanying drawings, a pair of magnetic equalizing bars 10 and 12 of soft iron, adapted to be positioned between tracks 14, are charged with opposite polarities by means of permanent magnets 16, 18, 20 and 22 spaced through the length of the bars, four magnets being shown in the embodiment of the invention illustrated in the drawings. For this purpose, the positive, or north poles of each of the magnets are rigidly mounted on, or connected to, one of the bars, as for example, bar 10, by means of clips 24 preferably of non-magnetic material, and screwthreaded bolts, 26, and the other or south poles are similarly connected to the bar 12. Through the arrangement of the permanent magnets relatively to the equalizer bars, the bar 10 is charged inductively with one polarity and the bar 12 is charged inductively with the opposite polarity.

The magnetic charges of the bars 10 and 12 are neutralized or modified by means of electro-magnets 28, 30 and 32 suitably spaced along the length of the bars which, when energized, have a polarity opposite to that of the permanent magnets 16, 18, 20 and 22. To this end, each electro-magnet is provided with a soft iron core 34 the ends of which are mounted in pole pieces 36, preferably of high permeability by means of a pressed fit and by peening the ends of the cores over the pole pieces, and are supported on the bars 10 and 12 by means of bolts 38 of non-magnetic material extending through holes in the pole pieces and the bars. The pole pieces 36 are also preferably spaced from the bars 10 and 12 by spacing means 39 of brass or other non-magnetic material to obtain the desired proportioning of the magnetic flux between the cores of the electro-magnets and the air above the equalizing bars. Each electro-magnet is provided with a winding 40 connected in an electric circuit in such a manner that each electro-magnet has a polarity of the same direction as each of the other electro-magnets and of a direction opposite that of the permanent magnets 16, 18, 20 and 22. Thus in the present embodiment, the positive, or north poles of the electro-magnets are adjacent the bar 12 and the negative, or south poles are adjacent the bar 10. The end electro-magnets 28 and 32 are spaced nearer the end permanent magnets 16 and 22, respectively, than the intermediate permanent and electromagnets are to each other in order to obtain a more uniform distribution of the magnetic potential along the equalizing bars 10 and 12.

A suitable wiring arrangement for energizing the electro-magnets is illustrated diagrammatically in the accompanying drawings in which the windings are connected by wires 41 in series between the terminals of a source of electricity 42, such as a battery of suitable type. The degree of magnetization may be controlled by adjusting the current passing through the windings by means of a variable resistance or rheostat 44, to permit the magnetism of the electro-magnets to neutralize the magnetic force of the permanent magnets. A switch 46 is also provided in the electric circuit which may be opened or closed by a railway signalling mechanism to control the magnetization of the electro-magnets and the operation of the control device, the switch being opened to de-energize the electro-magnets when a train is to be stopped and closed when a train is permitted to pass.

The permanent magnets 16, 18, 20 and 22 may be of any suitable construction. In the preferred embodiment of the invention they are formed of a number of bars 48, which may be straight, or horse shoe or other suitable shape and which are held in spaced relation by means of end clamps 49, preferably of non-magnetic material and by spacing members 50, also preferably of non-magnetic material inserted between the bars.

The bars 48 are made of a material which retains its magnetization, such for example as hard steel.

The windings of the electro-magnets are made of insulated wire wound on the cores 34 impregnated with an insulating compound and retained on the cores by means of discs 52 of non-conducting material which form spool ends for the windings. The windings are covered and protected by means of cylindrical casings 54 or housings of non-magnetic material slightly spaced from the outer layer of the windings and closed by end caps 56 of non-magnetic material hermetically sealed on the ends of the casings and holding the cores and casings in spaced relation. The space between the winding and the wall of the casing is filled with insulating material 58.

The operation of the apparatus is briefly as follows: The permanent magnets 16, 18, 20 and 22 tend to magnetize the bar 10 by induction with one polarity uniformly throughout its entire length and to magnetize the other bar 12 uniformly with the opposite polarity. The magnetism induced under normal conditions in the bars 10 and 12 by the permanent magnets 16, 18, 20 an 22 is neutralized by the electro-magnets 28, 30 and 32, which, when energized, have a magnetism of the opposite polarity to that of the permanent magnets and of approximately the same strength so that, under these conditions no magnetic field is created above the magnet structure. When the brake mechanism of a passing train is to be operated, the switch 46 is opened and the electro-magnets 28, 30 and 32 become de-magnetized through the stopping of the electric current. The bars 10 and 12 thereupon become charged inductively by the permanent magnets. The soft iron cores of the electro-magnets then act as keepers for the permanent magnets through which the magnetic circuit is completed or closed and a return path for the magnetic flux from the poles of the permanent magnets is formed. Sufficient reluctance is provided in this circuit by the non-magnetic spacers 39 between the pole pieces 36 of the electro-magnet cores and the bars 10 and 12 to cause a part of the flux to pass through the atmosphere above the magnet device and form a magnetic field of sufficient strength to operate the brake control mechanism of a passing train.

The strength of the electric current through the electro-magnets 28, 30 and 32 is so adjusted by means of the variable resistance or rheostat 44, that the resulting magnetic strength of the electro-magnets is equal to the strength of the permanent magnets, or the current may be increased to produce a magnetic strength slightly greater than that of the permanent magnets and thereby reverse the magnetic potential between the equalizing bars. The strengthening action of the electro-magnets, together with the keeper action of the electro-magnet cores counteracts any tendency towards a loss of magnetism of the permanent magnets, and permits a long, uniform magnetic field of any desired strength to be obtained.

The strength of the magnetic field above the magnet structure may be further adjusted by varying the thickness of the spacing elements 39 between the pole pieces of the magnets and the equalizing bars, and thereby adjusting the reluctance to magnetic flux of the path through the electro-magnet cores. Since the flux between the equalizing bars will divide between the electro-magnet cores and the air path inversely to the reluctance of these paths, by increasing the reluctance through the core path by the insertion of thicker spacing elements a larger portion of the flux will be diverted to the air above the structure, thereby increasing the strength of the magnetic field through which the brake control device passes.

Since the greater the flux produced by a permanent magnet, the longer will it retain its magnetomotive force, the positioning of the pole pieces of the electromagnets in close spaced relation with the equalizing bars maintains a relatively large flux and thereby aids the permanent magnets to retain their magnetism.

By means of the present invention, therefore, a magnetic field of any desired length and of a uniform strength throughout, except at the extreme ends, is provided, thus enabling it to exert a sufficiently sustained action to operate a passing brake control device regardless of its speed. The strength of this field may, moreover, be varied without distortion.

Having described the invention, what I claim and desire to secure by Letters Patent is:—

1. A device of the kind described which comprises magnetic equalizing bars, permanent magnets adapted to magnetize said bars with opposite polarity uniformly throughout their lengths, electro-magnets adapted to neutralize the magnetization of said bars uniformly throughout their lengths, cores of low reluctance in said electro-magnets adapted to form a return circuit for the magnetic flux of said permanent magnets and means for inserting a desired additional reluctance in said return circuit.

2. A device of the kind described which comprises a pair of equalizing means permanent magnetic means arranged to induce a magnetic charge of one polarity uniformly in one of said means and a magnetic charge of the opposite polarity in the other of said means, a return circuit of low reluctance between said means and means for increasing the reluctance of said return circuit to a desired amount.

3. A device of the kind described which comprises a pair of spaced bars of high magnetic permeability, a number of spaced permanent magnets having poles of one polarity adjacent one of said bars and poles of the opposite polarity adjacent the other of said bars, a number of electromagnets having cores extending substantially from one bar to the other, pole pieces supporting the ends of said cores and supported by said bars, inserts of comparatively high reluctance between said pole pieces and said bars and an electric circuit adapted to magnetize said electro-magnets oppositely to said permanent magnets.

4. A device of the kind described which comprises a pair of magnetic equalizing means, permanent magnets adapted to induce magnetism of one polarity in one of said means and magnetism of the opposite polarity in the other of said means, electromagnets adapted to induce magnetic effects of the opposite polarity to that of said permanent magnets and means for varying the strength of said electro-magnetic effects.

5. A device of the kind described which comprises a pair of equalizing bars, a plurality of groups of permanently magnetized bars, said groups being spaced at uniform intervals along the lengths of said bars to impart opposite polarities to the said equalizing bars, and a plurality of electromagnets, one less in number than the said groups of permanently magnetized bars, arranged alternately to said groups at uniform intervals, the said intervals being longer than the intervals between said groups, the said electromagnets when energized having polarities opposite to those of the permanently magnetized bars in said groups, the end electromagnets being spaced closer to the end than to the intermediate groups.

6. A device of the kind described which comprises a pair of equalizing bars, a plurality of groups of permanently magnetized bars, said groups being spaced at uniform intervals along the lengths of said equalizing bars to impart opposite polarities to said equalizing bars, and a plurality of electromagnets arranged alternately to said groups of permanently magnetized bars, the said electromagnets when energized having polarities opposite to those of the permanently magnetized bars in said groups and being situated closer to the said groups at the end of the said equalizer bars than to the intermediate groups.

7. A magnetic device according to claim 6, in which means for adjusting the magnet reluctance are provided in the circuits of the electro-magnets.

8. A device of the kind described which comprises a pair of equalizing means, permanent magnetic means arranged to induce a magnetic charge of one polarity uniformly in one of said means and a magnetic charge of the opposite polarity in the other of said means, a return magnetic circuit between said means, and means for adjusting the reluctance of said return circuit.

9. A device of the kind described which comprises a pair of equalizing bars, a plurality of groups of permanent magnets spaced at intervals along the lengths of said equalizing bars to impart opposite polarities to the said equalizing bars, and a plurality of electro-magnets spaced at intervals along said equalizing bars, the said electro-magnets when energized having polarities opposite to those of the permanent magnets, the end electro-magnets being spaced closer to the end than to the intermediate groups of permanent magnets.

10. A magnetic device according to claim 9 in which means for adjusting the magnetic reluctance are provided in the circuits of the electro-magnets.

In witness whereof I have hereunto set my hand at San Francisco, California this 6th day of July, 1922.

HOWARD S. FOLKER.